(12) United States Patent
Jamali

(10) Patent No.: US 6,269,188 B1
(45) Date of Patent: Jul. 31, 2001

(54) WORD GROUPING ACCURACY VALUE GENERATION

(75) Inventor: Hamadi Jamali, Redwood City, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/041,854

(22) Filed: Mar. 12, 1998

(51) Int. Cl.⁷ .............................. G06K 9/34; G06K 9/72; G06K 9/60; G10L 13/00; G06F 15/00
(52) U.S. Cl. .................... 382/229; 382/177; 382/231; 382/305; 382/306; 382/309; 382/310; 704/251; 707/533
(58) Field of Search ................................. 382/181, 225, 382/229, 230, 231, 309, 310, 173, 175, 177, 305, 306; 704/8, 9, 10, 251; 707/1, 104, 533

(56) References Cited

U.S. PATENT DOCUMENTS 3,969,698 * 7/1976 Bollinger et al. ..................... 382/225
4,941,125 7/1990 Boyne .................................. 707/104

(List continued on next page.)

FOREIGN PATENT DOCUMENTS

WO 97/22947   6/1997   (WO) .

OTHER PUBLICATIONS

Gorgevik, D. et al., "Word Candidate Generation in Cyrillic OCR Based on ALN Classifiers", IEEE Bipolar/Bicmos Circuits and Tech. Meeting, 1998, pp. 870–874, XP–000802005, ISBN: 0–7803–4498–7.

Raza, G. et al., "Recognition of poor quality words without segmentation", IEEE International Conference On Systems, Man and Cybernetics, Oct. 14, 1996, pp. 64–69, XP000729923, ISBN: 0–7803–3281–4.

(List continued on next page.)

*Primary Examiner*—Leo Boudreau
*Assistant Examiner*—Daniel G. Mariam
(74) *Attorney, Agent, or Firm*—Fenwick & West LLP

(57) ABSTRACT

The present invention is a computer-implemented method for calculating word accuracy. Word grouping accuracy values (260) are calculated (212) by using the character accuracy values (250) calculated by an OCR program present in a computer system. The present invention preferably uses these character accuracy values (250) to create a word grouping accuracy value (260). Various methods are employed to calculate the word accuracy (260), including binarizing the character accuracy values (250), modified averaging of the character accuracy values (250), and creating fuzzy visual displays of word grouping accuracy values (260). The calculated word grouping accuracy values (260) are then adjusted based upon known OCR strengths and weaknesses, and based upon comparisons to stored word lists and the application of language rules. In a system with multiple character recognition techniques, the system can compare the accuracy values (260) of different versions of the word groupings to find the most accurate version. Then, the most accurate version of the word groupings is kept.

20 Claims, 17 Drawing Sheets

U.S. PATENT DOCUMENTS

| | | | |
|---|---|---|---|
| 4,949,287 | | 8/1990 | Yamaguchi et al. ............... 707/520 |
| 5,040,218 | * | 8/1991 | Vitale et al. ........................ 704/260 |
| 5,303,361 | | 4/1994 | Colwell et al. ......................... 707/4 |
| 5,359,667 | | 10/1994 | Borowski et al. .................. 382/138 |
| 5,369,742 | | 11/1994 | Kurosu et al. ...................... 707/522 |
| 5,375,235 | | 12/1994 | Berry et al. ............................. 707/5 |
| 5,418,946 | | 5/1995 | Mori ....................................... 707/1 |
| 5,526,443 | | 6/1996 | Nakayama .......................... 382/229 |
| 5,555,362 | | 9/1996 | Yamashita et al. ................. 707/517 |
| 5,617,488 | * | 4/1997 | Hong et al. ......................... 382/229 |
| 5,628,003 | | 5/1997 | Fujisawa et al. ................... 707/104 |
| 5,642,288 | | 6/1997 | Leung et al. .................... 364/478.11 |
| 5,675,665 | * | 10/1997 | Lyon ................................... 382/229 |
| 5,687,250 | | 11/1997 | Curley et al. ....................... 382/112 |
| 5,757,983 | | 5/1998 | Kawaguchi et al. ............... 382/305 |
| 5,764,799 | * | 6/1998 | Hong et al. ......................... 382/229 |
| 5,774,580 | | 6/1998 | Saitoh ................................. 382/176 |
| 5,781,658 | | 7/1998 | O'Gorman .......................... 382/172 |
| 5,781,879 | * | 7/1998 | Arnold et al. ........................... 704/9 |
| 5,805,747 | * | 9/1998 | Bradford ............................. 382/310 |
| 5,818,952 | * | 10/1998 | Takenouchi et al. ............... 382/229 |
| 5,832,470 | | 11/1998 | Morita et al. .......................... 707/1 |
| 5,848,184 | | 12/1998 | Taylor et al. ....................... 382/173 |
| 5,850,480 | | 12/1998 | Scanlon .............................. 382/229 |
| 5,878,385 | | 3/1999 | Bralich et al. .......................... 704/9 |
| 5,905,811 | * | 5/1999 | Shiiyama et al. ................... 382/231 |
| 5,926,565 | | 7/1999 | Froessl ............................... 382/181 |
| 5,933,531 | * | 8/1999 | Lorie ................................... 382/229 |
| 5,943,443 | | 8/1999 | Itonori et al. ....................... 382/225 |
| 5,999,664 | | 12/1999 | Mahoney et al. .................. 382/305 |
| 6,002,798 | | 12/1999 | Palmer et al. ...................... 382/176 |
| 6,005,973 | * | 12/1999 | Seybold et al. .................... 382/229 |
| 6,006,226 | | 12/1999 | Cullen et al. .......................... 707/6 |
| 6,023,528 | | 2/2000 | Froessl ............................... 382/181 |

OTHER PUBLICATIONS

Hull, J.J., "Performance Evaluation for Document Analysis", International Journal of Imaging Systems and Technology (Winter 1996), vol. 7, No. 4, pp. 357–362.

Liang, Jisheng, et al., "Performance Evaluation of Document Layout Analysis Algorithms on the UW Data Set", SPIE, vol. 3027, pp. 149–160.

Maderlechner, G., et al., "Classification of Documents by Form and Content", Pattern Recognition Letters (Nov. 1997), vol. 18, No. 11–13, pp. 1225–1231.

Mosataki, et al "Variable–order N–gram generation by word–class splitting and consecutive word groupling", IEEE, pp. 188–191, 1996.*

Hull, et al "word image matching as a technique for degraded text recognition", IEEE, pp. 665–668, 1992.*

* cited by examiner

Recognized character:  
Stored template of character:  
Character accuracy value of recognized "p" based upon comparison to stored template: 0.95.
Figure 2b
Recognized word "rock" composed of four recognized characters and their character accuracy values:
r: 0.95     o: 0.72     c: 0.92     k: 0.82
Figure 2c

| | |
|---|---|
| Word 1: | "ear" |
| Characters and Accuracy Values: | "e": 0.93 "a": 0.89 "r": 0.72 |
| Average Accuracy Value: | 0.85 |
| Normalized Accuracy Value: | 0.67 |
| | |
| Word 2: | "earring" |
| Characters and Accuracy Values: | "e": 0.93 "a": 0.89 "r": 0.72 "r": 0.72 "i": 0.93 "n": 0.85 "g": 0.87 |
| Average Accuracy value: | 0.84 |
| Normalized Accuracy value: | 0.71 |

Figure 5b

| Versions of Word Grouping | Word Accuracy Value |
|---|---|
| "example"$_{OCR\ D}$ | 0.95 |
| "example"$_{OCR\ A}$ | 0.91 |
| "example"$_{OCR\ B}$ | 0.87 |
| "example"$_{OCR\ C}$ | 0.72 |

Figure 8b

WORD GROUPING ACCURACY VALUE GENERATION

TECHNICAL FIELD

This invention pertains to the field of data storage and filing systems, more specifically, to those systems employing optical character recognition.

BACKGROUND ART

The field of document imaging is growing rapidly, as modem society becomes more and more digital. Documents are stored in digital format on databases, providing instantaneous access, minimal physical storage space, and secure storage. Today's society now faces questions on how best to transfer its paper documents into the digital medium.

The most popular method of digitizing paper documents involves using a system comprising a scanner and a computer. The paper documents are fed into a scanner, which creates a bitmap image of the paper document. This bitmap image is then stored in the computer. The computer can take a variety of forms, including a single personal computer (PC) or a network of computers using a central storage device. The bitmapped images must be able to be retrieved after they are stored. One system for filing and retrieving documents provides a user interface which allows a user to type in a search term to retrieve documents containing the search term. Preferably, the system allows the user to type in any word that the user remembers is contained within the desired document to retrieve the desired document. However, in order to retrieve documents on this basis, the document must be character recognized. That is, the computer must recognize characters within the bitmapped image created by the scanner.

Another common usage of digitizing documents is to digitize long paper documents in order to allow the document to be text searched by the computer. In this usage, a user types in the key word the user is looking for within the document, and the system must match the search term with words found within the document. For these systems, the document must be character recognized as well.

The most common method of recognizing characters is by using an optical character recognition (OCR) technique. An optical character recognition technique extracts character information from the bitmapped image. There are many different types of optical character recognition techniques. Each has its own strengths and weaknesses. For example, OCR 1 may recognize handwriting particularly accurately. OCR 2 may recognize the Courier font well. If OCR 1 is used to recognize a document in Courier font, it may still recognize the majority of the characters in the document. However, it may recognize many of the characters inaccurately. A user may not know of an OCR's strengths and weaknesses. A user may not know whether or not the types of documents the user typically generates are of the kind that are accurately recognized by the OCR present on the user's system. Current systems do not inform the user of the quality of the recognition of the OCR technique. The user finds out how accurate the recognition was only by using the document for the purpose for which it was stored into the computer system, at which time it may be too late to correct.

An inaccurately recognized document can lead to several problems. First of all, in a system in which documents are stored and retrieved based on their contents, an inaccurately recognized document may become impossible to retrieve. For example, if a user believes the word "imaging" is in a specific document, the user will type in "imaging" as the search term. However, if the word "imaging" is recognized incorrectly, such that it was recognized as "emerging," the user's search will not retrieve the desired document. The user may not remember any other words in the document, and thus the document is unretrievable. In a system where documents are digitized to allow text searching of the document, the same problem occurs. Misrecognized words are not found by the use of the correct search terms.

Thus, there is a need to allow the user to determine whether a recognized word is of acceptable quality. By allowing the user to determine whether a word is of acceptable quality, the user can ensure that the document is retrieved by the use of that word as a search term. Also, a user can ensure that words within the document are accurately recognized for internal document searching purposes. Additionally, in a system with multiple optical character recognition techniques, there is a need to be able to compare the accuracy of the different versions of the document to create a version that is the most accurate.

DISCLOSURE OF THE INVENTION

The present invention is a computer-implemented method for calculating word grouping accuracy values (260). The present invention receives (200) data, performs (204) an optical character recognition technique upon the received data, and creates (208) word groupings. The system then calculates (212) word grouping accuracy values (260) for the created word groupings.

Word grouping accuracy values (260) are calculated (212) by using character accuracy values (250) determined by the OCR technique. The present invention preferably uses these character accuracy values (250) to create a word grouping accuracy value (260). Various methods are employed to calculate the word accuracy (260), including binarizing the character accuracy values (250), modified averaging of the character accuracy values (250), and employing fuzzy visual displays of word grouping accuracy values (260). The calculated word grouping accuracy values (260) are adjusted based upon known OCR strengths and weaknesses, and based upon comparisons to stored word lists and the application of language rules. Word grouping accuracy values (260) are normalized and displayed or compared to a threshold. The words whose accuracy values (260) exceed the threshold may then be used to index the documents or provide search terms for searching within the document. If no word groupings exceed the threshold then the user is offered different options, including to clean the image by performing another OCR or scanning the document again, or to reset the threshold to a lower value.

BRIEF DESCRIPTION OF THE DRAWINGS

These and other more detailed and specific objects and features of the present invention are more fully disclosed in the following specification, reference being had to the accompanying drawings, in which:

FIG. 2b is an illustration of two characters and their accuracy values 250.

FIG. 2c is an illustration of a word grouping and its individual character accuracy values 250.

FIG. 5b is an illustration of word groupings and accuracy values 260 in accordance with the present invention.

FIG. 8b is an illustration of a word grouping version table 850.

DETAILED DESCRIPTION OF THE PREFERRED EMBODIMENTS

Figure 1:
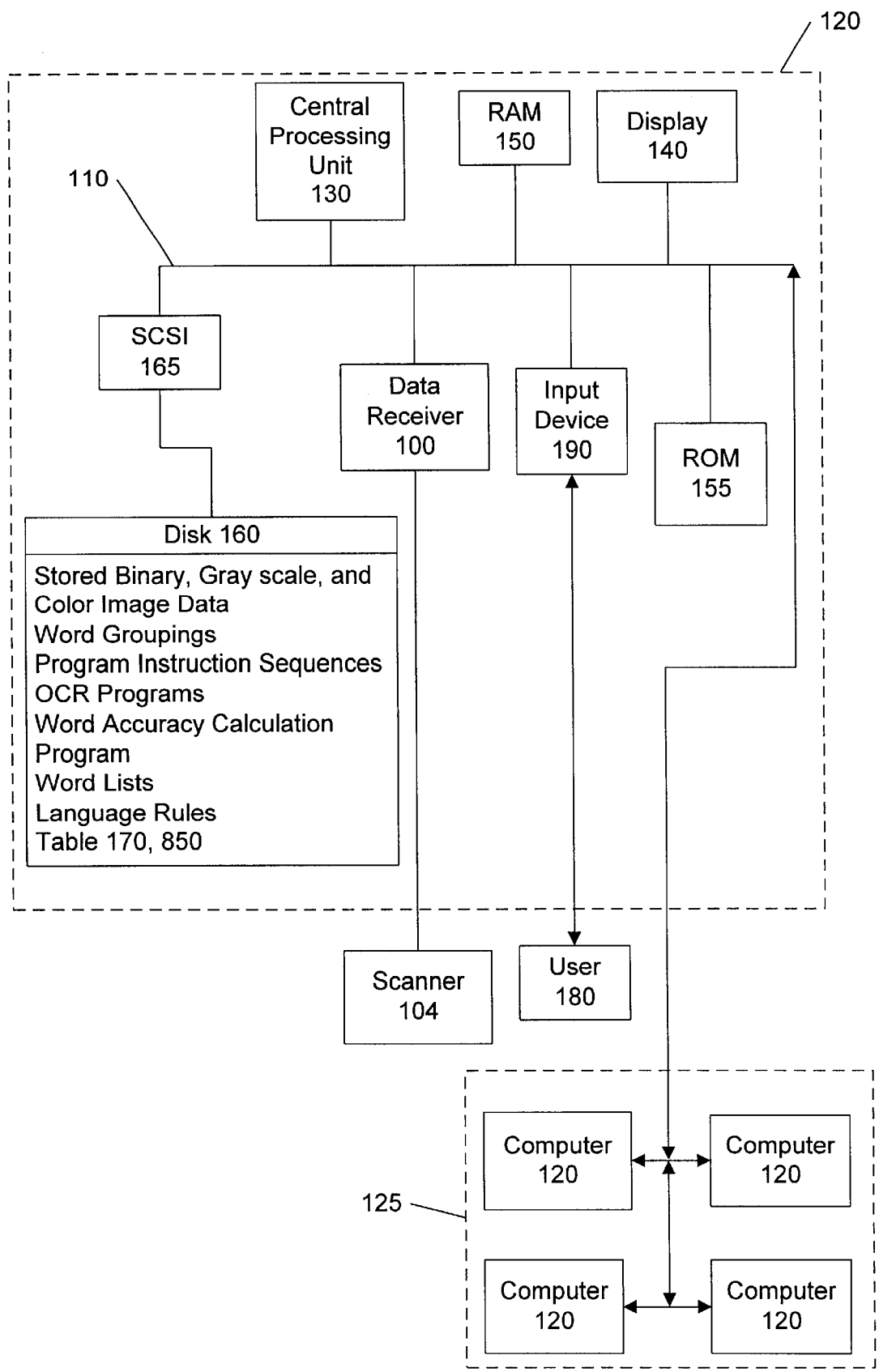
FIG. 1 is a block diagram of a computer system embodying the present invention.

FIG. 1 illustrates a hardware embodiment of the present invention. A data receiver 100 is coupled to the data bus 110 of a computer 120. The data receiver 100 preferably receives data from a scanner 104, which can be any conventional scanner, such as Canon DR 3020 or Canon PICS 4400. Alternatively, the data receiver can be a network adapter or Internet connection comprising a modem and a phone line which couples the computer 120 to a remote data source from which data is received. The computer 120 includes a central processing unit 130, such as an Intel Pentium processor, a display 140. an input device 190, random access memory (RAM) 150, read-only memory (ROM) 155, and a disk 160, all interconnected through bus 110.

An input device 190 is a mouse, keyboard, or other pointing device that allows a user 180 to interact with the computer 120. ROM 155 provides CPU 130 with unvarying functions such as executing programs initialized at the start-up of computer 120. RAM 150 provides the CPU 130 with data and instruction sequences that are loaded from disk 160. The disk 160 is, for example, 1.6 Gigabyte disk that interfaces to the computer bus through a Small Computer System Interface (SCSI) interface 165. Disk 160 stores data files such as binary, gray-scale, and color image files, a table 170, text files, and programs including a word accuracy calculation program and one or more OCR programs. Disk 160 is a single device or multiple devices. The components of computer 120 take conventional form. Computer 120 can stand alone or is a part of a network of computers 125 comprised of individual computers 120 coupled together through Ethernet connections. The present invention can be used in conjunction with any computer operating system, such as Windows 95, Windows NT, or OS/2, resident in memory 155.

Figure 2A:
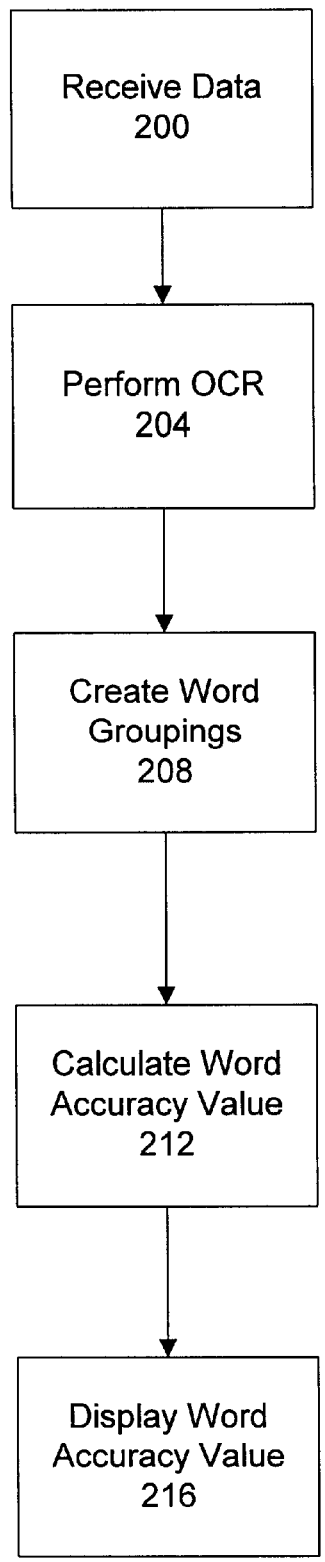
FIG. 2a is a flowchart diagram illustrating the process steps of an embodiment of the present invention in which word accuracy is calculated for a single OCR system.

As illustrated in FIG. 2, the present invention receives 200 data. As described above, data can 200 be received in a multitude of ways, including by a scanner or by a remote connection with another computer. If a scanner 104 is coupled to data receiver 100, then the paper document fed into the scanner 100 is digitized. Digitizing a paper document involves creating a bitmap of the paper document. After a digitized version of the document is created, an OCR is performed 204 upon the bitmap. A Canon OCR technique, specified in U.S. Pat. No. 5,379,349, is preferably used as the OCR technique; however, any OCR technique can be used in accordance with the present invention. The OCR technique creates character information from the bitmap. A description of how the character recognition process is accomplished is found in the above-mentioned U.S. Pat. No. 5,379,349. A document may be a single piece of paper or multiple pieces of paper that are substantively related.

Most OCRs provide a character accuracy value 250 for characters recognized from the bitmap. The character accuracy value 250 is typically created by comparing the recognized character with a stored template of the character. The differences in the two versions of the character are quantized and represented as an accuracy value 250. For example, a recognized "p" and a stored template of a "p" are shown in FIG. 2b. This "p" is given a character accuracy value 250 of 0.95 because of the differences in shape between the recognized "p" and the stored template of the "p."

Figure 3:
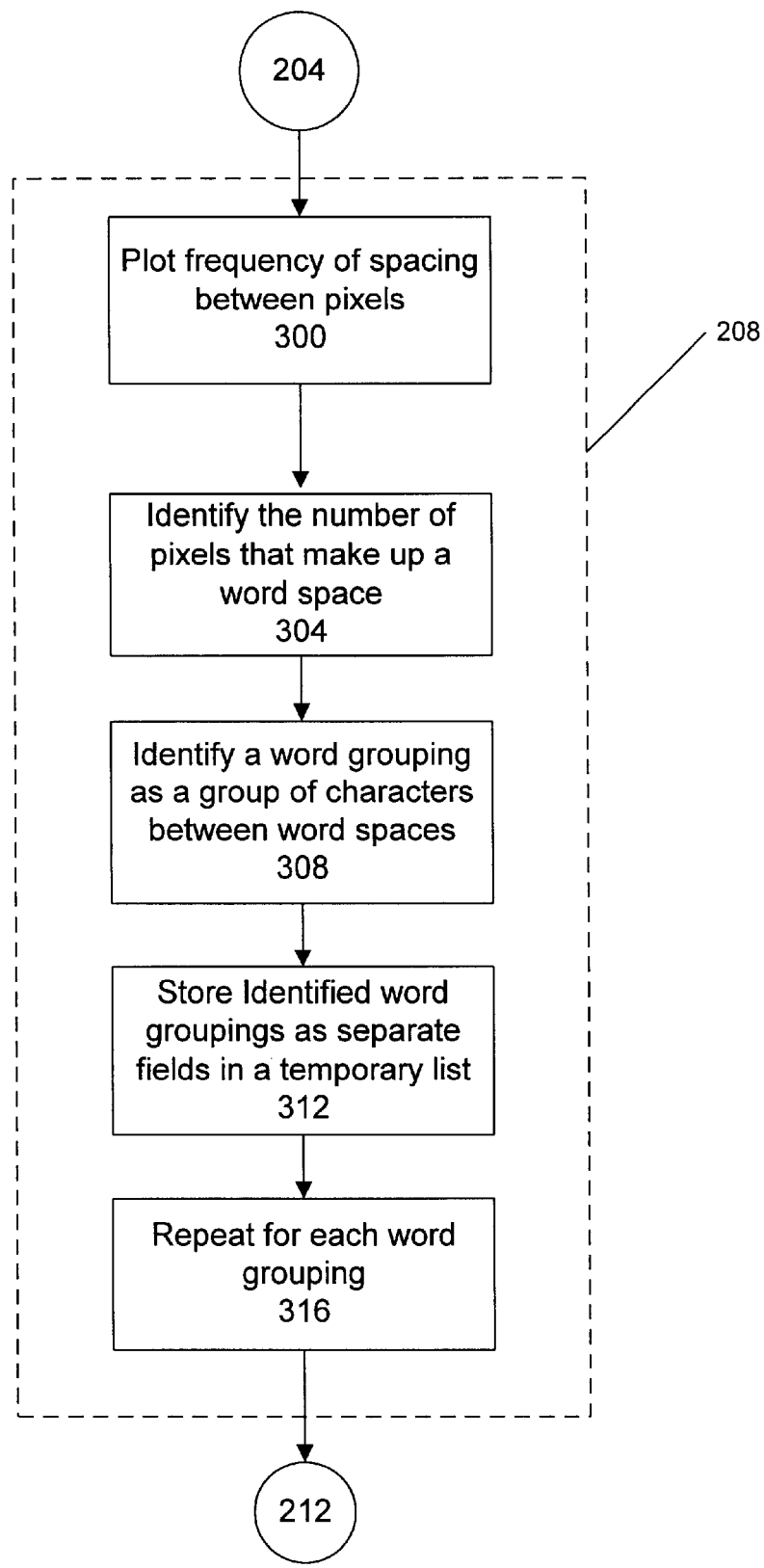
FIG. 3 is a more detailed flowchart of process step 208 of the present invention.

The system next creates 208 word groupings from the recognized characters, as shown in FIG. 3.

After word groupings are created 208 from the extracted character information of the bitmap of the paper document, the system calculates 212 the word grouping accuracy values 260 of the created word groupings. Word grouping accuracy values 260 are calculated to provide the user 180 with an easily understood measure of the quality of an OCR's recognition. Displaying a string of character accuracy values 250 may not communicate useful information to the average user 180. For example, in FIG. 2c, the word "rock" is composed of four characters "r", "o", "c", and "k." The "r" is recognized at a 0.95 accuracy value 250, the "o" is recognized at a 0.72 accuracy value 250, the "c" is recognized at a 0.92 character accuracy value 250 and the "k" is recognized at a 0.82 accuracy value 250.

Displaying individual character accuracy values 250 does not inform the user 180 whether the word "rock" was accurately recognized. The user 180 knows that "r" and "c" were accurately recognized, but the user 180 does not know how the poor recognition of the "o" and the "k" affects the recognition of the word as a whole. Determining the accuracy of the word, as opposed to individual characters, is critical in systems that allow retrieval of documents by the use of text-searching. In those systems, when the user 180 searches for a document, the user 180 enters a search term composed of words. Thus, it is more important to know whether an entire word is accurately recognized. as opposed to whether individual characters are accurately recognized. Additionally, in documents in which OCR techniques are performed in order to allow the document itself to be text searched, it is important to know whether the OCR has accurately recognized the document. If the OCR recognition is inaccurate, words searched for will not be found, even if the words are present within the image. Finally, if multiple words are displayed with all of their individual character accuracy values 250, the page soon becomes an indecipherable conglomeration of letters and numbers.

Figure 4:
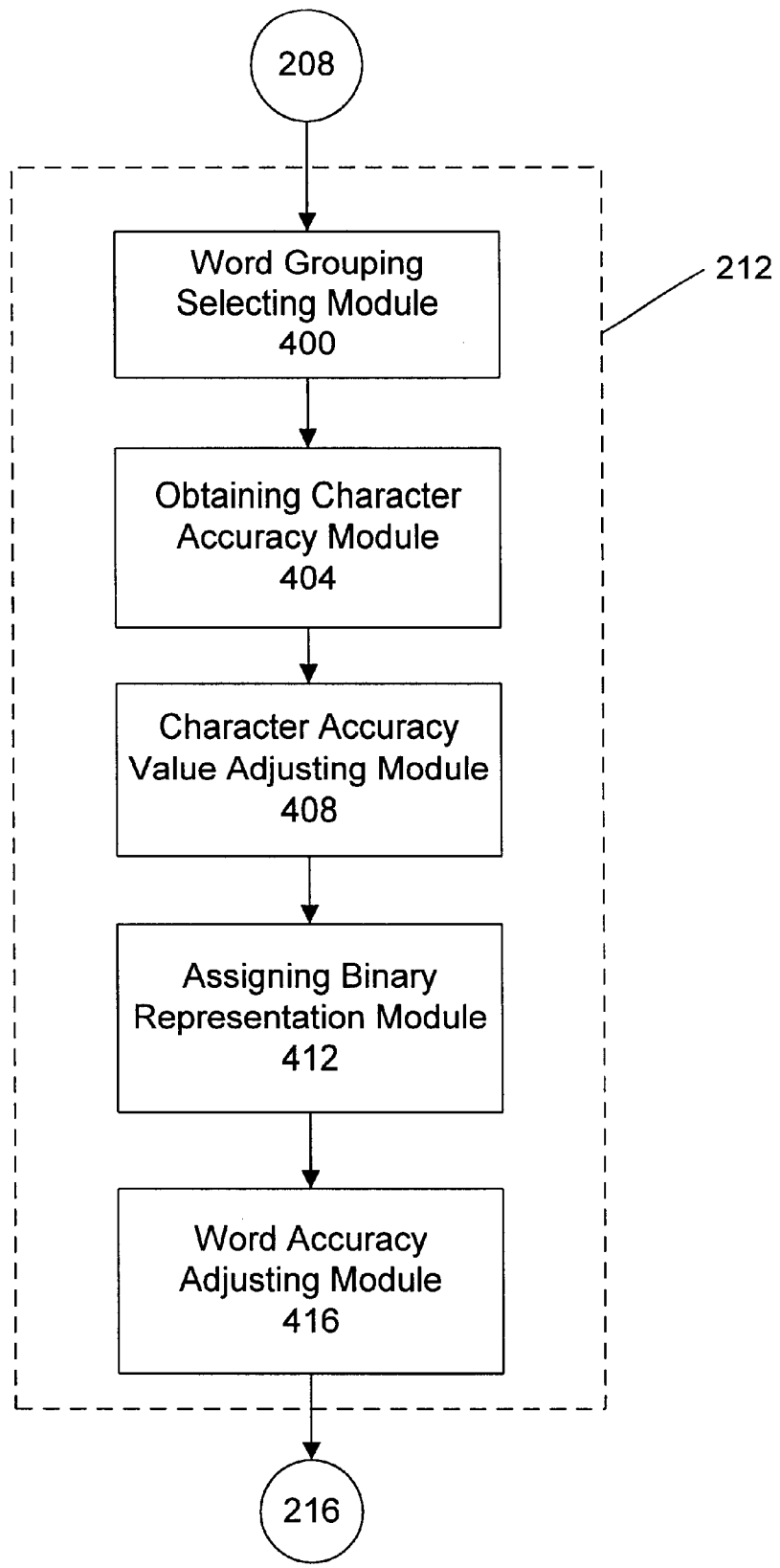
FIG. 4 is a more detailed flowchart of process step 212 of the present invention.

FIG. 4 illustrates the process steps of an embodiment of the current invention calculating word accuracy in a system employing a single OCR. The system selects one of the newly created word grouping using a selecting module 400. The system then obtains the character accuracy value 250 for one of the characters in the selected word grouping by using an obtaining character accuracy value module. As described above, character accuracy values 250 are typically available after performing an OCR. The system then applies a character accuracy value adjusting module 408 to adjust the character accuracy value 250 based upon known OCR weaknesses. This adjustment is based upon the fact that OCRs typically have unique strengths and weaknesses. The system determines whether the character being examined is one of the known characters that is not accurately recognized, or is a font, typeface, or style that is not accurately recognized. In this situation, the system subtracts a constant from the obtained character accuracy value 250. The constant is typically 0.05, but can be set higher or lower, depending upon user preferences. For OCR strengths, the adjusting module 408 adjusts the character accuracy value 250 upwards to reflect characters, fonts, or typefaces that the OCR typically recognizes more accurately than other recognition systems In the example of FIG. 2c, perhaps the word "rock" was created using the Times New Roman font, and the OCR applied to the document recognizes the Times New Roman font accurately. Then, the individual character accuracy values 250 are adjusted upwards to become "r": 1.0, "o": 0.77, "c": 0.97, and "k": 0.87. Thus, although the OCR had a confidence factor of only 0.72 that the "o" was really an "o", the system of the present invention raises the value to 0.77 due to the strength of that OCR's ability to recognize Times New Roman. If this number were displayed to the user 180, the user 180 would feel more confident that the "o" was correctly recognized because of the adjustment of the present invention.

Of course, if a document contains words created in one font that is either strongly or weakly recognized by the OCR present in the system, than all of the characters are adjusted uniformly, and the adjustment is factored out. However, in multiple OCR situations, discussed below, it is important that the adjustment occur, as the different versions of the word groupings created by each OCR are compared against each other. The above process is repeated for each character in the selected word grouping, and is repeated for each word grouping in the document.

An assigning module 412 is then applied to assign a binary representation to the characters in the selected word grouping, discussed in more detail below. A preliminary word grouping accuracy value 260 is thereby generated for the selected word grouping. A word accuracy adjusting module 416 is applied to the selected word grouping to adjust the preliminary word grouping accuracy value 260 based upon predefined factors such as stored list comparisons or the application of stored language rules, discussed in more detail below. This process is preferably repeated for each word grouping in the received group of data. After a word grouping accuracy value 260 is calculated for the last word grouping, the system proceeds to display the word groupings and their accuracy values 260 using a display module 216. The above-described modules may be implemented as hardware, firmware, or software, in accordance with the present invention.

Figure 5A:
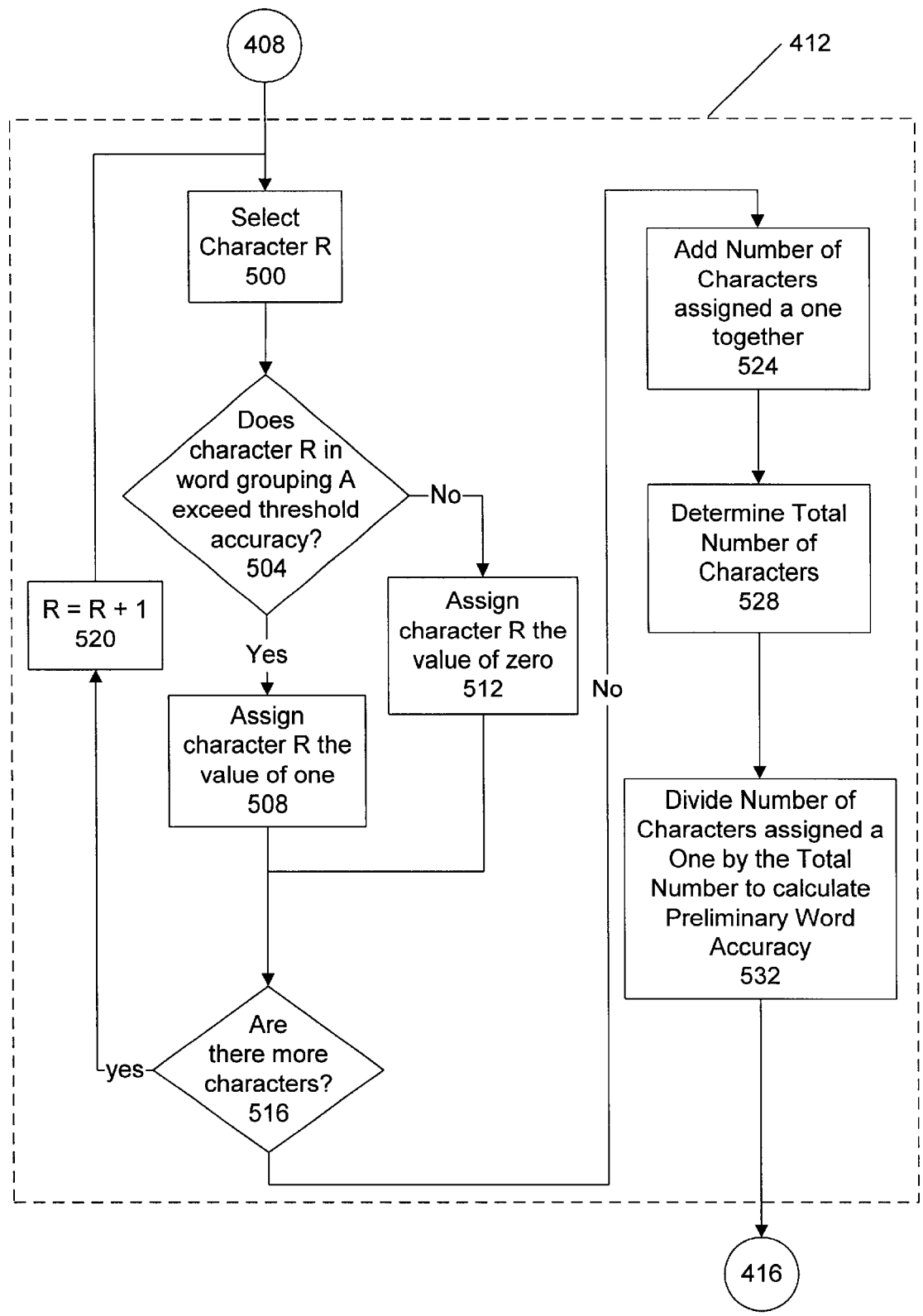
FIG. 5a is a more detailed flowchart illustrating the assigning binary representation module 412 of the present invention.

FIG. 5a illustrates in more detail the assigning binary representation module 412. The system selects 500 a character in the selected word grouping. Then, the system determines 504 whether the first character in the word grouping has an accuracy value 250 that exceeds a threshold accuracy level. The threshold accuracy level is preferably user defined. The user 180 can therefore set the recognition quality of the entire system based upon what threshold the user 180 chooses. For example, if the user 180 desires a system that accepts characters at 90% accuracy, the user 180 can set the threshold at 0.9. If the user 180 is more tolerant of error, the user 180 can set the threshold lower.

The system compares the accuracy of the selected character to the user-defined threshold to determine what representation to assign the character. If the character accuracy value 250 exceeds the threshold, the character is assigned 508 a "1." If the character accuracy value 250 does not exceed the threshold, the character is assigned 512 a "0." The system determines 516 if there are more characters. If there are, a counter is incremented 520, and the process is repeated. If all of the characters have been assigned a representation, the system then adds 524 the number of characters assigned a "one" together to determine the total number of characters assigned a "one". Then the system determines 528 the total number of characters in the word grouping. Finally, the system calculates the preliminary word accuracy for the word grouping by dividing 532 the number of characters assigned a "one" by the total number of characters in the word grouping.

The system uses the above method of calculating because it normalizes word grouping accuracy values 260. Normalizing provides a better representation of the recognition quality of a word. For example, in FIG. 5b, the word "ear" has character accuracy values 250 of 0.93, 0.89, and 0.72 assigned to its characters. The threshold is 0.8. Therefore, the "e" and the "a" are assigned a 1 and the "r" is assigned a 0. The word grouping accuracy value 260 for "ear" is therefore 0.67 (2/3). The next word is "earring." The character accuracy values 250 are the same for the first four letters, the "i" is recognized at a 0.93, the "n" is recognized at a 0.85, and the "g" is recognized at a 0.87. Therefore, its word accuracy is 0.71 (5/7). The percentage of characters with an accuracy value above the threshold is greater in the word "earring" than in the word "ear." This is reflected in the word accuracy value assigned to each word. In one embodiment, repeated characters are discounted for the purposes of calculating word grouping accuracy values 260. In the above example, the "r" would only be counted once in calculating the accuracy value, leading to an accuracy value of 0.83 (5/6). This embodiment is useful when the user 180 is attempting to evaluate the accuracy of the OCR, as the OCR is not penalized for making the same mistake multiple times in a word.

Simple averaging (adding together individual character accuracy values 250 and dividing by the total number of characters) of the character accuracy values 250 may also be used to calculate word grouping accuracy values 260. However, simple averaging may not provide an accurate representation of the OCR's recognition. In the above example, the word grouping accuracy value 260 of "ear" would be 0.85, and the value of "earring" would be 0.84 using simple averaging. The user 180 would believe that "ear" was recognized with greater accuracy than "earring." However, in light of the above discussion, this belief is erroneous. This is explained by observing that an inaccurately recognized character is more detrimental to the word recognition of shorter words than longer words. Thus, if one of three letters is misrecognized, the word may be completely misinterpreted. However, if one of seven letters is misrecognized, the word may still be recognized correctly based on its surrounding letters, using a fuzzy matching system.

Figure 5C:
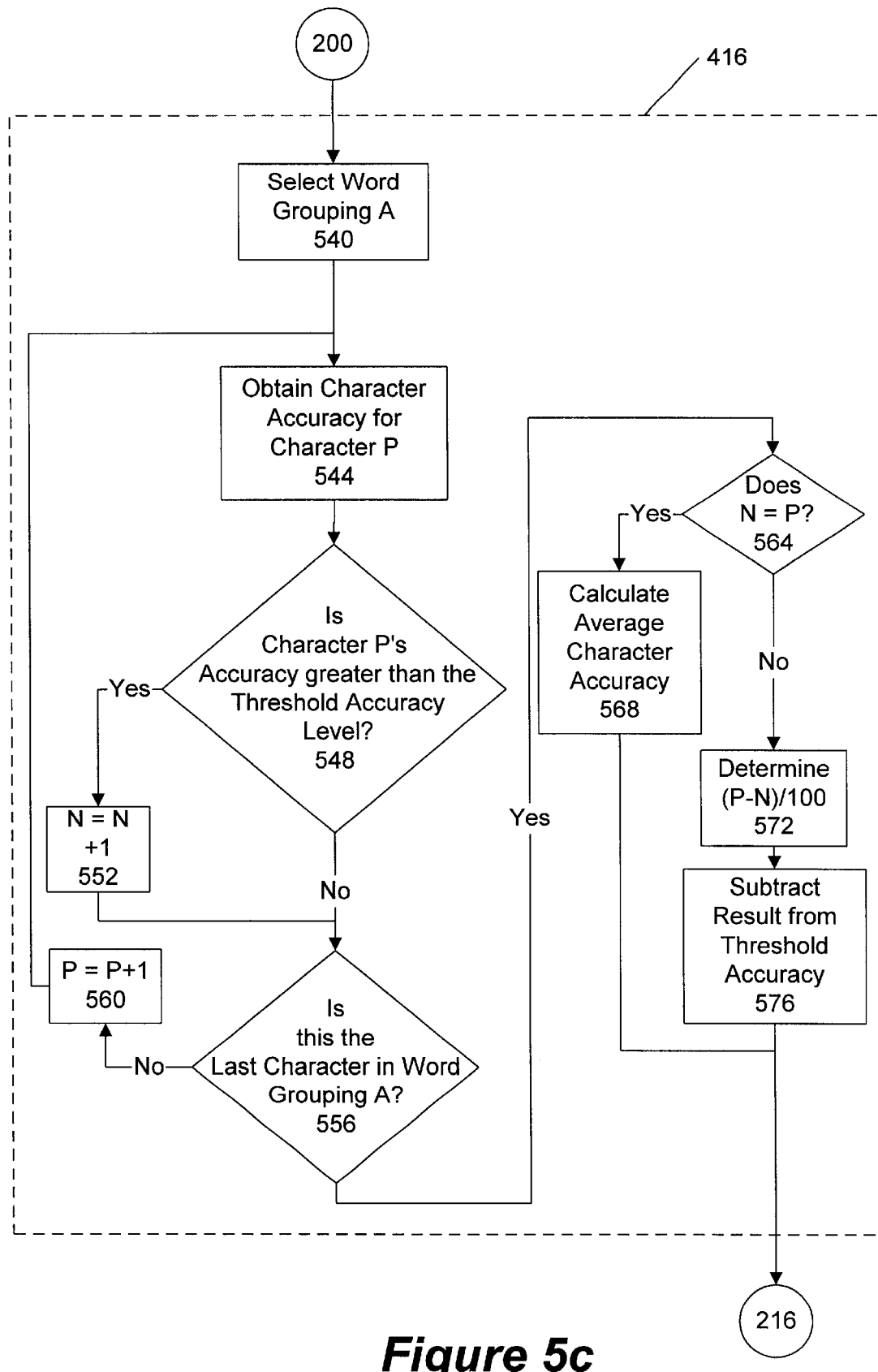
FIG. 5c is a flowchart of one alternate embodiment of calculating word grouping accuracy values 260 in accordance with the present invention.

Alternate methods of calculating word grouping accuracy values 260 may be beneficially employed depending upon the user 180 and the system. FIG. 5c illustrates a second method of calculating word grouping accuracy values 260. A word grouping is selected 540. A character accuracy value 250 is obtained 544 for a first character in the selected word grouping. The system determines 548 whether the obtained character accuracy value 250 is greater than a threshold accuracy level. The threshold is set by the user 180 to define an overall accuracy level for the word accuracy generation system. If the obtained character accuracy value 250 is greater than the threshold, a counter is incremented 552. If the obtained value 250 is less than the threshold, the counter is not incremented. In either case, the system determines 556 whether this was the last character in the word grouping. If there are more characters, the system increments 560 a counter and repeats the process for the next character.

If there are no more characters, the system determines 564 whether all of the characters in the selected word grouping passed the threshold. If all of the characters did pass the threshold, the system calculates 568 the word grouping accuracy value 260 of the selected word grouping as the average of the character accuracy values 250. If at least one of the characters did not exceed the threshold, the system determines 572 the percentage of characters that did not exceed the threshold, using the formula (P-N)/100, where P is the total number of characters in the word grouping, and N is the number of characters which exceeded the threshold. Then the system calculates the word grouping accuracy value 260 of the selected word grouping by subtracting 576 the result from the threshold accuracy value. This process is repeated for each word grouping.

An advantage to using this method over assigning binary representation is that this method allows word grouping accuracy values 260 to be searched using any integer. In the first method for calculating word grouping accuracy values 260, the values are quantized or digitized. Thus, if a user 180 wanted to search words created having a range of values from 0.34 to 0.42, the first method is unlikely to retrieve any word groupings, as word grouping accuracy values 260 created using its scheme are the result of some fraction such as ¾, or ⁶⁄₇. However, the values 260 generated by the second method are calculated as the average of individual character accuracy values 250, which may be any integer over the threshold, or values 260 are calculated as the result of the percentage subtracted from the threshold value, which also generates a broader range of results. Thus a user 180 searching for a range of values is more likely to retrieve results in a system using the second method rather than the first method.

Figure 5D:
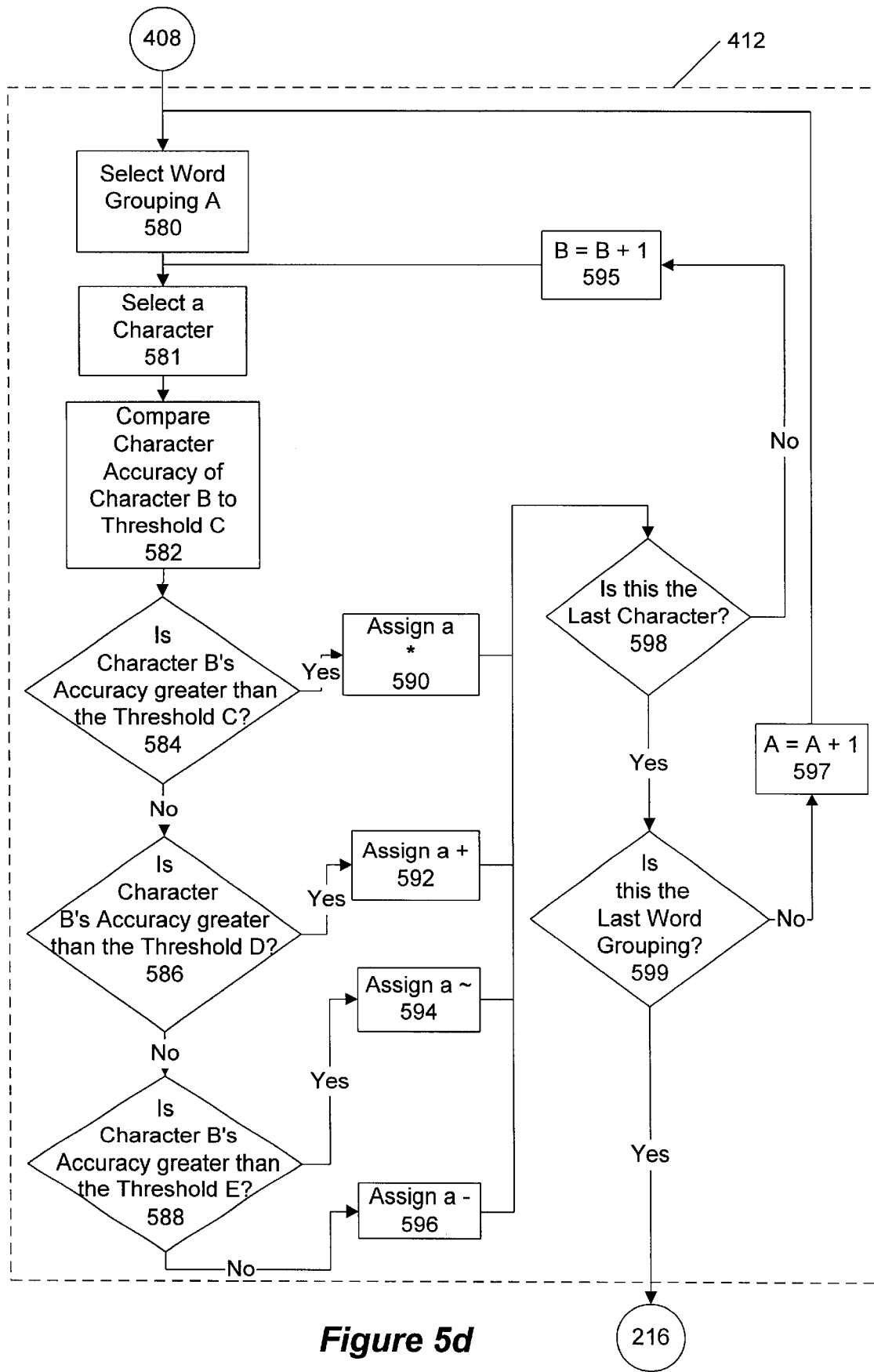
FIG. 5d is a flowchart of a second alternate embodiment of calculating word grouping accuracy values 260 in accordance with the present invention.

FIG. 5d displays a third method of calculating word grouping accuracy values 260. A word grouping is selected 580. A character is selected 581 from the selected word grouping. The accuracy value 250 of the selected character is obtained 582. The system then determines 584 whether the accuracy value 250 of the selected character is greater than a first threshold. If it is, the character is assigned 590 a "*". Any symbol may be assigned to the character. However, as the first threshold is the highest threshold, the symbol should visually represent the fact that the character is in the most accurate category. After assigning 590 the "*", the system repeats 598 for the next character, or if it was the last character, the system repeats 599 for the next word grouping. If it was the last character in the last word grouping, the system proceeds to the display step 216.

If the selected character did not exceed the first threshold, the system determines 586 whether the character's accuracy value 250 exceeds the second threshold. If it does, then a "+" is assigned 592. Again, any symbol may be used but the symbol should represent to the user 180 that the character is in the second best category. If the character does not pass the second threshold, the system compares 588 the character to a third threshold. If the character exceeds the third threshold, a "~" is assigned. If the character fails to exceed the third threshold, a "−" is assigned. After all of the characters have been assigned a symbol, the words and their symbols are displayed 216 to the user 180.

Word grouping accuracy values 260 generated in accordance with this method are advantageous because they visually communicate to the user 180 the quality of the characters in a given word. Thus, if a user 180 sees a word and the symbols "**+*" displayed, the user 180 knows that the word has been recognized accurately. This visual representation may be more effective in communicating accuracy values 260 than numeric displays. The thresholds in the above method are preferably set by the user 180 to suit the user's preferences. One of ordinary skill in the art can see that other methods of calculating word grouping accuracy values 260 may be used in accordance with this invention. For example, symbols may be assigned to words instead of characters, allowing the user 180 to have a visual representation of word grouping accuracy values 260. Or, the word grouping accuracy value 260 of a word may be set equal to the accuracy value 250 of the character in the word grouping which has the lowest accuracy value 250.

For all of the above methods, after the word grouping accuracy value 260 calculated for a word grouping, the value and its associated word grouping are stored in a table 170 located on disk 160. The table 170 is used to retrieve the accuracy value 260 for a word grouping when the value 260 needs to be adjusted or displayed.

Figure 6A:
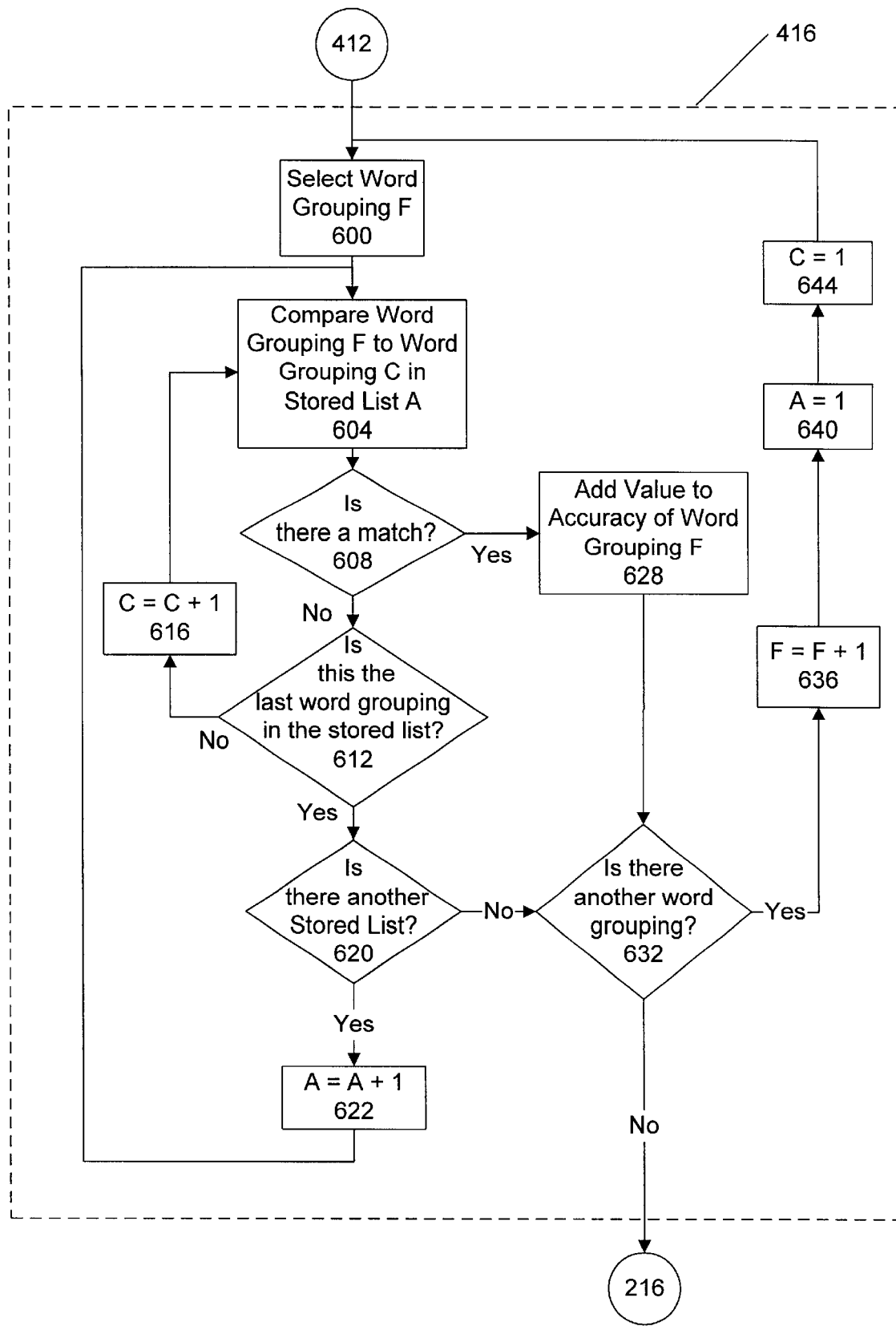
FIG. 6a is one embodiment of the adjusting word accuracy module 416 of the present invention.

FIG. 6a describes one embodiment of the adjusting word accuracy module 416. In this embodiment, the word grouping accuracy value 260 of a selected word grouping is adjusted based upon comparisons of the selected word grouping to word groupings on a stored list. The stored list is preferably composed of commonly used words such as those found in a dictionary. Additionally, words or acronyms that are commonly used in the types of documents being processed by the system are preferably added to the stored list by the user 180. For example, if a company using the present invention is a software development company, they may create a list including words such as "debug", "beta", and "GUI." The additional or custom words are added to the dictionary word list, or, in a preferred embodiment, the custom words are stored in a separate word list.

In accordance with the present invention, a first word grouping is selected 600. The word grouping is compared 604 to a word grouping in the stored list. The system determines 608 whether there is a match between the selected word grouping and the word grouping on the stored list. If there is a match, a constant is added 628 to the accuracy value 260 of the selected word grouping. The system determines 632 if there is another word grouping to be compared, and if there is, a counter for the selected word groupings is increased 636, the counter for the stored list is set 640 to one, and the counter for the stored list is set 644 to one. If the system determines that there are no more word groupings to be compared, the system moves to the display module 216.

If there was not a match between the selected word grouping and the word grouping of the stored list, the system determines 612 if this the last word grouping on the stored list. If there are more word groupings on the stored list, a counter is incremented 616, and the next word on the list is compared with the selected word grouping. If there are no more word groupings on the stored list, the system determines 620 if there are more stored lists. If there are more stored lists, a counter is incremented 622 and the comparison process is repeated for the new stored list. If there are no more stored lists, no value is added to the selected word grouping, and the system moves on to the next word grouping in process step 632.

In the example of the word "earring," the word grouping accuracy value 260 was 0.71. If the above module 416 were applied, "earring" would be compared to a stored list of words. If a dictionary was one of the stored lists, a match would be found. The adjusting module 416 would increase the value of the word accuracy to 0.81 because of the match, using a constant of 0.05. The user 180 would then see the increased confidence factor, and feel more confident that the word was accurately recognized. However, if in the original example, the word was "GUI", and the "I" was misrecognized as a "L", the word "GUL" would have been created. The OCR confidence factor for the "L" may still be high, for example, at 0.75, because the OCR may believe that the "L" was recognized correctly. A user 180 who sees "GUL" who is not the author of the document may be unsure whether GUL is a new acronym or a misrecognized word. However, a stored list comparison containing technical words and acronyms would not find a match for "GUL", and therefore, the value would not be adjusted. Since words correctly recognized will have a 0.5 value added, the value for "GUL" will appear low to the user 180. The user 180 will have less confidence that the word "GUL" is accurately recognized, and may choose to exclude "GUL" from being used to index the document. Thus, one advantage of this system is that it allows non-experts to perform document entry. In another embodiment of the system, a constant is subtracted from the word accuracy measure if no match is found. In either embodiment, the system is optimized if the authors of documents update the word lists frequently with the acronyms and special word uses of the authors.

Figure 6B:
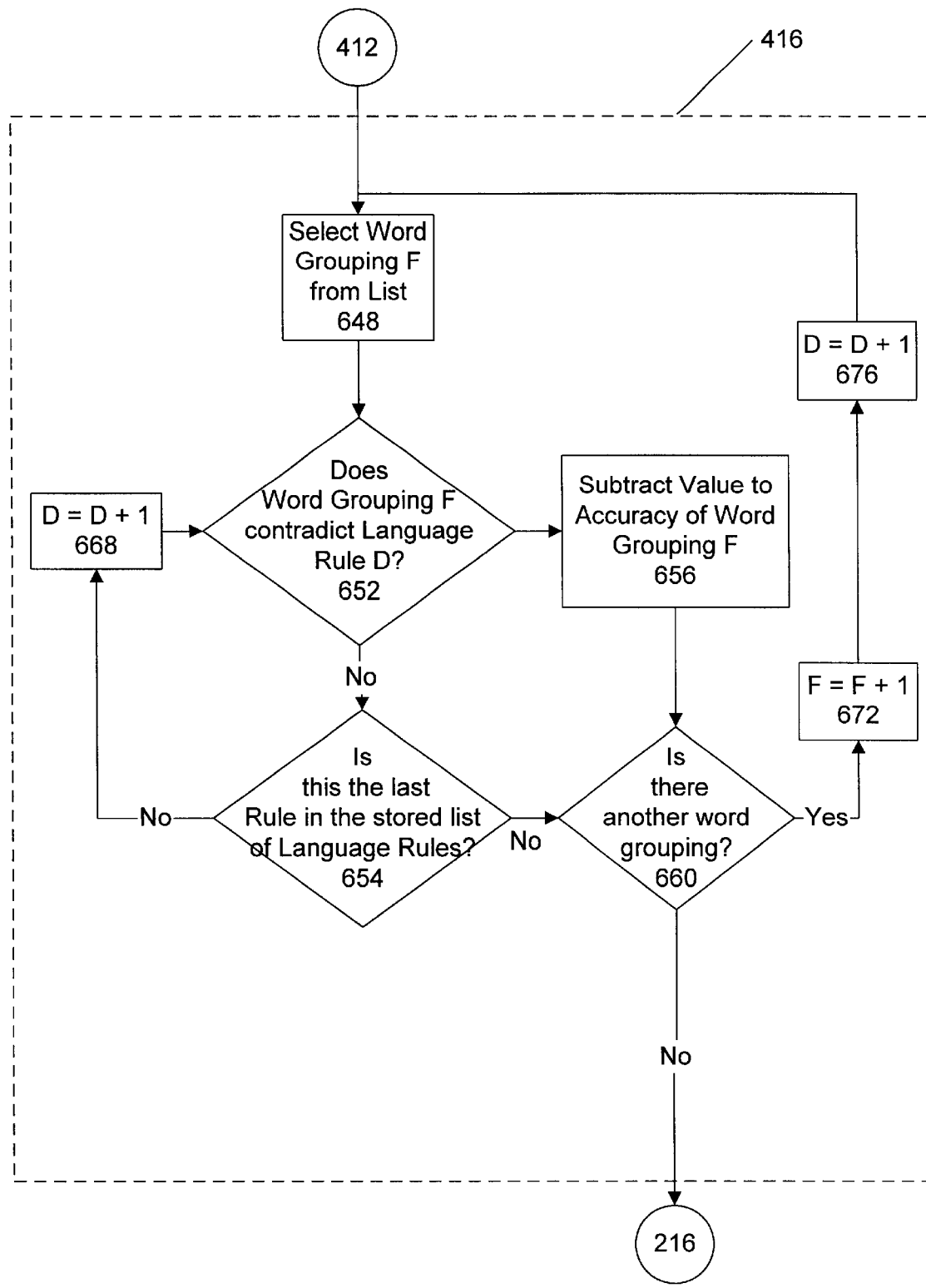
FIG. 6b is an alternate embodiment of the adjusting word accuracy module 416 of the present invention.

In FIG. 6b an alternate embodiment of the adjusting word accuracy module is illustrated. In this embodiment, language rules are applied to the word grouping to adjust the word grouping accuracy value 260 of the selected word grouping. Language rules are rules such as no capital letter in the middle of a word. For example, if an OCR recognizes the word "example" as "exAmple", the application of a language rule would catch the mistake and subtract a constant from the word grouping accuracy value 260. Other language rules may include "no i before e except after c," the first letter of the first word of a sentence should be capitalized, etc. The list of language rules may be edited by the user 180 to create language rules that may be specific to the user's field. For example, if the present invention is used for a foreign language, foreign language rules may be implemented.

As illustrated in FIG. 6b, a word grouping is selected 648. The system determines 652 if the word grouping contradicts the first language rule. If it does, a value is subtracted 656 from the accuracy value 260 of the selected word grouping. If the word grouping does not contradict the first language rule, the system determines 654 if there are more language rules. If there are, a counter is incremented 668, and the next language rule is applied. If there are no more language rules to be applied or a language rule was applied, the system determines 660 if there are more word groupings. If there are not, the process proceeds to the display module 216. The above embodiment may be used alone or in conjunction with the stored list comparisons to provide a more complete word accuracy generation system. Other types of word accuracy checks may be used in accordance with the present invention.

Display module 216 displays the recognized word groupings and their associated word grouping accuracy values 260 to the user 180. This gives the user 180 an opportunity to understand how accurately the OCR recognized the document. If the OCR recognized the words poorly, the user 180 may be forced to delete the OCR version, and use the paper document in its paper form. Alternatively, the user 180 may employ another OCR to obtain a better result. If the OCR repeatedly generates inaccurate word groupings, the user 180 may decide to purchase another OCR system.

Keeping track of the OCR's performance is also important in an embodiment wherein the recognized word groupings are used to index a document. In this embodiment, an indexing list of the recognized word groupings is used to retrieve documents. The word groupings on the list are used as potential search terms for retrieving the document. For example, if the word "rock" was in a word list for Document A, the word "rock" may be entered as a search term to find and retrieve Document A. The indexing list is formed from the table 170 of word groupings and their accuracy values 260.

To begin the process, the table 170 is displayed to the user 180. The user 180 can then determine whether or not to remove some of the word groupings from the table 170. Words removed from the table 170 will not be on the indexing list. For example, the user 180 may want to prevent any word that does not appear to the user 180 to be an accurately recognized word from the list so it cannot be used to retrieve the document. This ensures that the word list used to index the document is kept free of "pollutants," which are words that are misrecognized and may introduce error into the file retrieval process. For example, if the word "ear" is on the list for Document A, but the true word was "eat", entering "ear" as a search term will retrieve Document A erroneously. However, if "ear" is displayed with a low word grouping accuracy value 260, the user 180 may choose to remove that word based upon its accuracy value 260 from the word list for Document A.

In the preferred embodiment, the user 180 simply specifies a level of accuracy value 260 that the user 180 would like to maintain in the user's word lists. For example, the user 180 may specify that all words that are recognized at less than 0.95 should not be kept. In this embodiment, after a word grouping has its final accuracy value 260 determined, its accuracy value 260 is compared to the threshold. If it passes, the word is kept in the indexing list. If it fails, it is not stored in the indexing list. Then, the user 180 does not have to view the results of the word accuracy generation, and does not have to perform any subsequent manual determinations. Again, this introduces an ease of use to the document file indexing system, as a user 180 without expertise may be used as the document imaging/filing clerk.

Another embodiment of the present invention displays the image of the document to the user 180 using color codes to indicate the accuracy values 260 of the words. For example one color, such as red, is assigned to words that have accuracy values 260 over a threshold of 0.5, and blue may be assigned to words having an accuracy value 260 of less than 0.5. This allows the user 180 to view the image of the document and visually understand which words are correctly recognized and which are not. The user 180 may set the threshold to whatever level of accuracy the user 180 requires.

Figure 7:
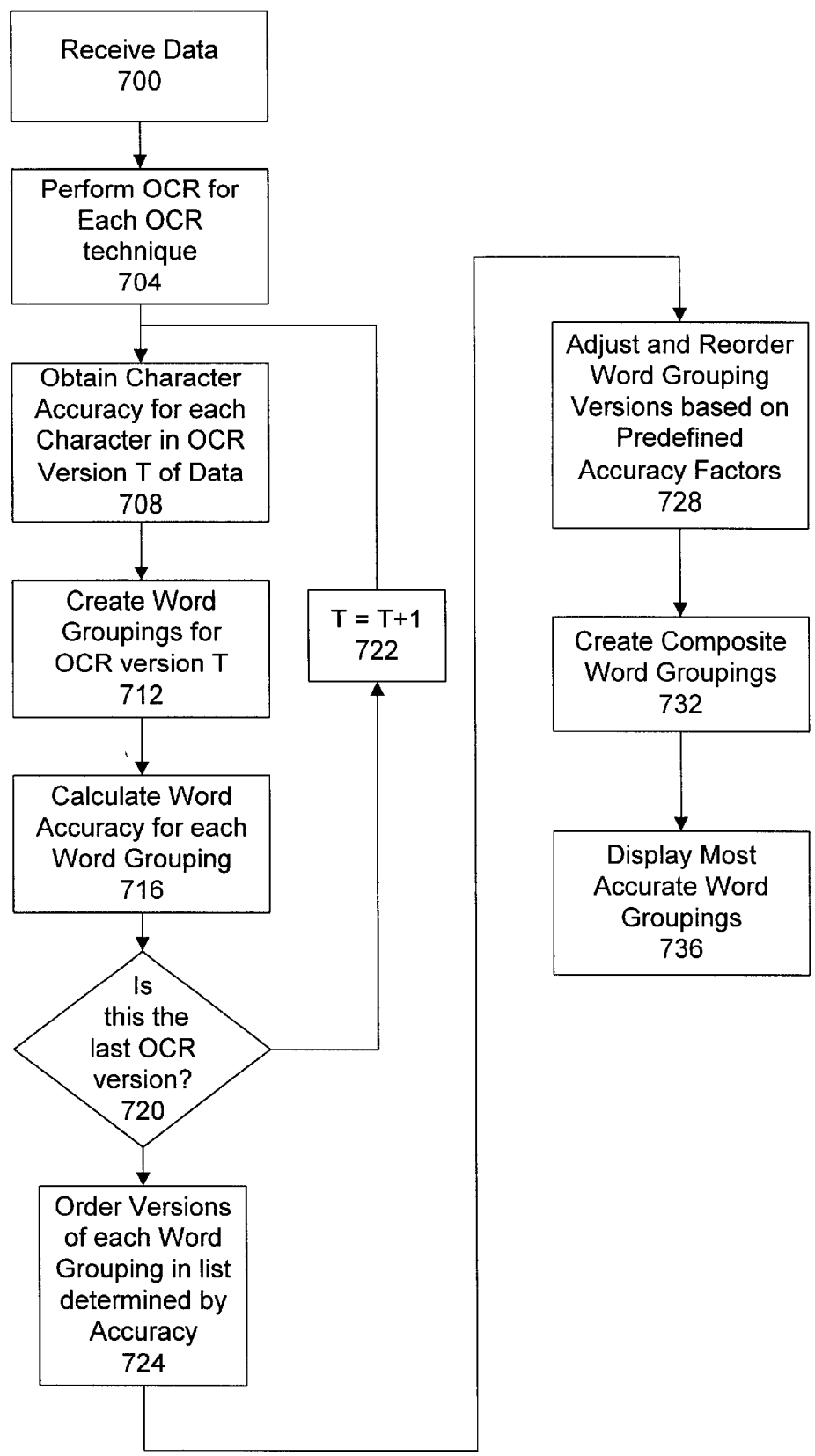
FIG. 7 is a flowchart diagram illustrating the process steps of an embodiment of the present invention in which word accuracy is calculated for a multiple OCR system.

FIG. 7a illustrates an embodiment of the present invention wherein multiple optical character recognition techniques are employed. In this embodiment, the present invention calculates word grouping accuracy values 260 of each word grouping created by each OCR. These word grouping accuracy values 260 can then be used to determine the most accurate version of the word grouping.

The system begins by receiving 700 data, and creating a bitmapped image of the paper document. An OCR program is applied 704 to the bitmapped image to recognize the characters in the image. This is repeated for each OCR present in the system. Thus, multiple versions of the original document are created.

The system then obtains 708 character accuracy values 250 for each character in the first version of the original document. Next, word groupings are created 712 from the first version of the document. Initial word grouping accuracy values 260 are calculated 716 for each created word grouping. The initial word grouping accuracy values 260 are calculated in accordance with the process described above in relation to FIGS. 5a–d. The word groupings and their accuracy values 260 are stored in a table 170. The process is repeated 720, 722 for each OCR version. Each OCR version has its own table 170 composed of word groupings and accuracy values 260.

The system then compares the different versions of each word grouping together to create tables 850 of versions of the word groupings ordered by accuracy. After an initial ordering has been created, the accuracy values 260 for each version of the word grouping are adjusted 728 in accordance with predefined accuracy factors. Then, the table 850 is reordered based on the new accuracy values 260.

In one embodiment, composite word groupings are created 732. Composite word groupings are word groupings created from the most accurate versions of each character in the word grouping. Thus, for example, if the word "help" was recognized by the present invention, each OCR would generate character accuracy values 250 for each of the four characters. OCR A may generate "h":0.87 "e":0.92 "l":0.95 "p":0.77 and OCR B may generate "h":0.91 "e":0.90 "l":0.90 "p":0.82. Therefore, if OCR A and B were the only OCRs present in the system, a composite word grouping is created using the "h" from OCR B, the "e" from OCR A, the "l" from OCR A, and the "p" from OCR B.

Finally, the most accurate word groupings 736 are displayed or stored into an indexing list. If composite word groupings are used, a word grouping accuracy value 260 is calculated for the composite word grouping and is compared with the other word groupings to determine the most accurate word groupings.

Figure 8A:
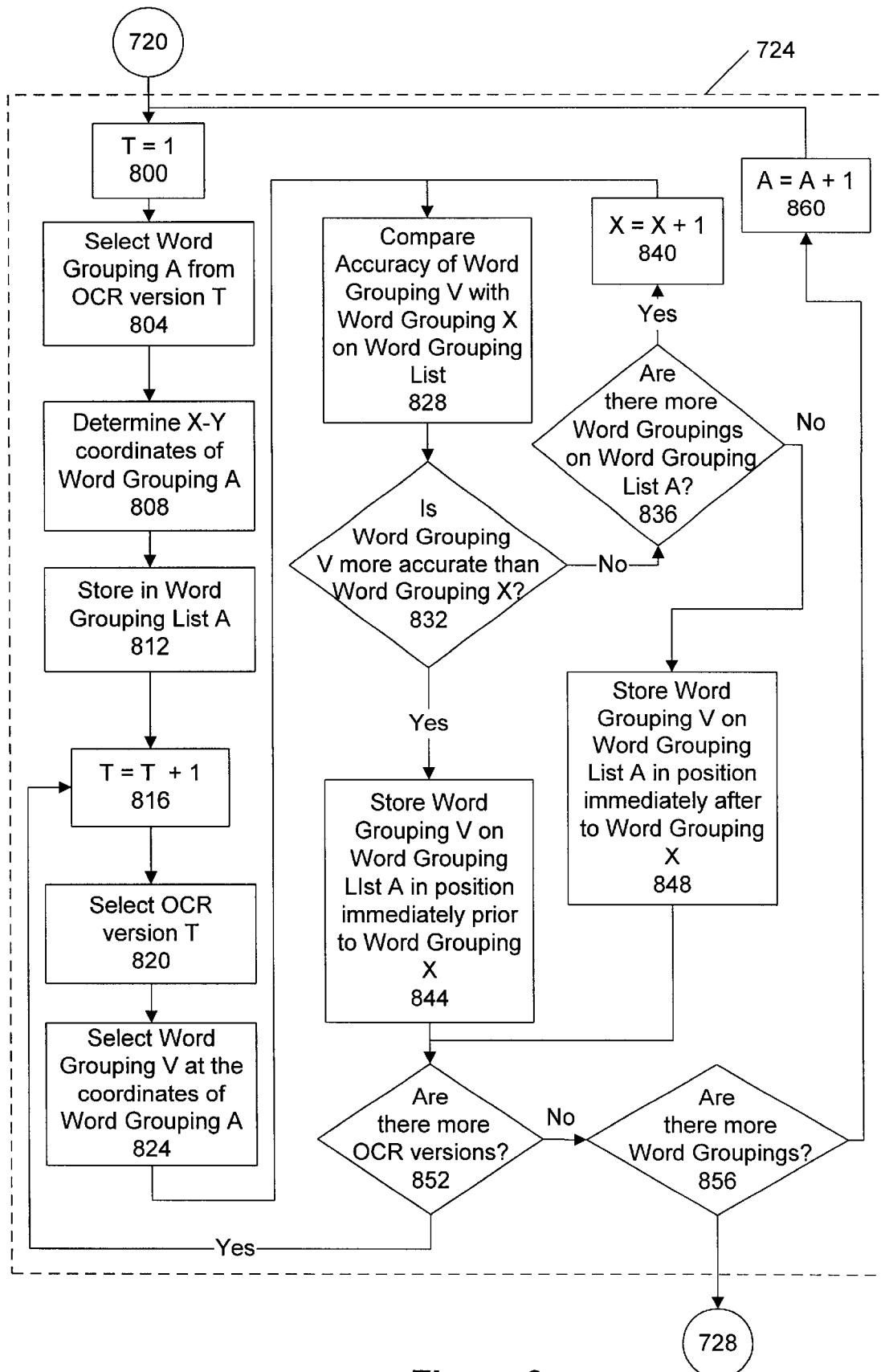
FIG. 8a is a more detailed flowchart of process step 724 of the present invention.

FIG. 8 illustrates ordering the versions of the word groupings in greater detail. A word grouping is selected 804 from the table 170 of word groupings created by the first OCR. The coordinates of the selected word grouping on the bitmapped image are determined 808. This process is performed in order to ensure that versions of the same word grouping are compared against each other. The version of the word grouping is then stored 812 in a first word grouping version table 850. A counter is incremented 816, and a next table 170 of word groupings created by a next OCR is selected 820. A word grouping is selected 824 that corresponds to the coordinates determined previously. The accuracy value 260 of the selected version is compared 828 to the accuracy value 260 of the version of the word grouping already stored in the word grouping version table 850.

The system then determines 832 whether the selected version has a greater accuracy value 260 than the version in the table 850. If it has, the selected version is stored 844 in the table 850 in a position immediately prior to the first version. If the selected version has a lesser accuracy value 260, the system determines 836 if there are more versions of the word grouping stored in the word grouping version table 850. If there are not, the selected version is stored 848 in a position immediately after the first version. If there are multiple versions of the word grouping already stored in the word grouping version table 850, the selected version is compared against all of the versions in the table 850 until a version is found that has a greater accuracy value 260. At that point, the version is stored in the table 850 in a position after the version having a greater accuracy value 260. For example, as illustrated in FIG. 8b, if the word "example" was in the original paper document, and there were OCRs A, B, C, and D present in the system, there would be four versions of the word "example" created. The system creates a table 850 of versions of the word "example," and orders the versions by accuracy. Thus, as shown, the calculated word grouping accuracy values 260 for the versions of example are: OCR A "example":0.91, OCR B "example":0.87, OCR C "example":0.72 and OCR D "example":0.95. The table 850 therefore orders the versions beginning with OCR D's "example", followed by A's, B's, and C's. If a fifth version of "example" is created by a fifth OCR, the fifth version would be compared to the four versions already in the table 850. The accuracy value of the fifth version is compared to the accuracy values of the other four, and is placed into the table accordingly. If the fifth version has an accuracy value 260 of 0.89, its version is placed in a position under OCR A's version and above OCR D's version.

The system then determines 852 if there are more OCR versions of the selected word grouping. If there are, a next version of the word grouping is selected, and the process is repeated. If there are no more versions of the word grouping, the system determines if there are more word groupings in the first OCR word grouping table 170. If there are, the next word grouping is selected, and the process is repeated.

Figure 9:
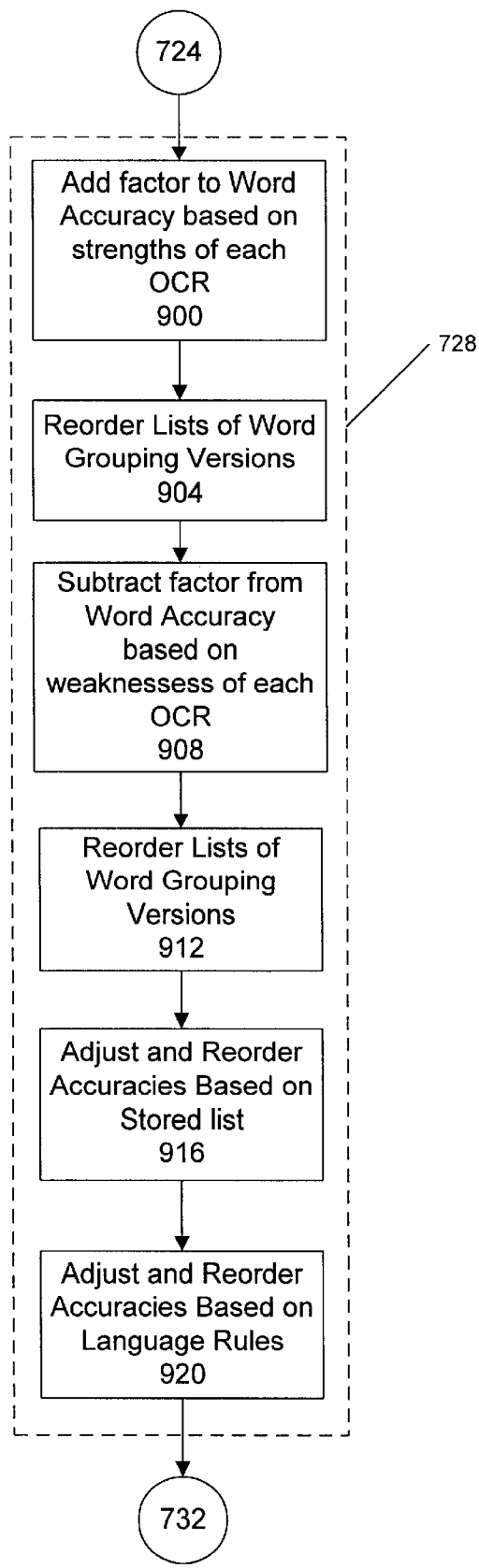
FIG. 9 is a more detailed flowchart of process step 728 of the present invention.

FIG. 9 illustrates adjusting accuracy values 260 after the versions of each word grouping have been ordered. First, a factor or constant is added 900 to a version of a word grouping based upon the strengths of the OCR which created the version of the word grouping. For example, if the word "help" has been created by OCR A, and OCR A recognizes Courier font particularly well, the word grouping accuracy value 260 for the version of help created by OCR A is adjusted upwards by a constant. This is repeated for each version of the word grouping in the word grouping table 170. Then the versions of the word grouping on the word grouping table 170 are reordered 904 based upon the changes in accuracy values 260.

A factor or constant is subtracted 908 from the versions based upon OCR weaknesses, in the manner described above. The table 170 is reordered 912 based upon any change in accuracy values 260. Then, the word grouping accuracy values 260 are adjusted and reordered based upon stored list comparisons 916 and language rule applications 920, as described in FIGS. 6a and 6b. The adjusting and reordering produces a final ordering of word grouping versions from most accurate to least accurate. At this point, all word groupings having an accuracy value over a threshold may be kept, or only the most accurate word grouping version may be kept.

Figure 10:
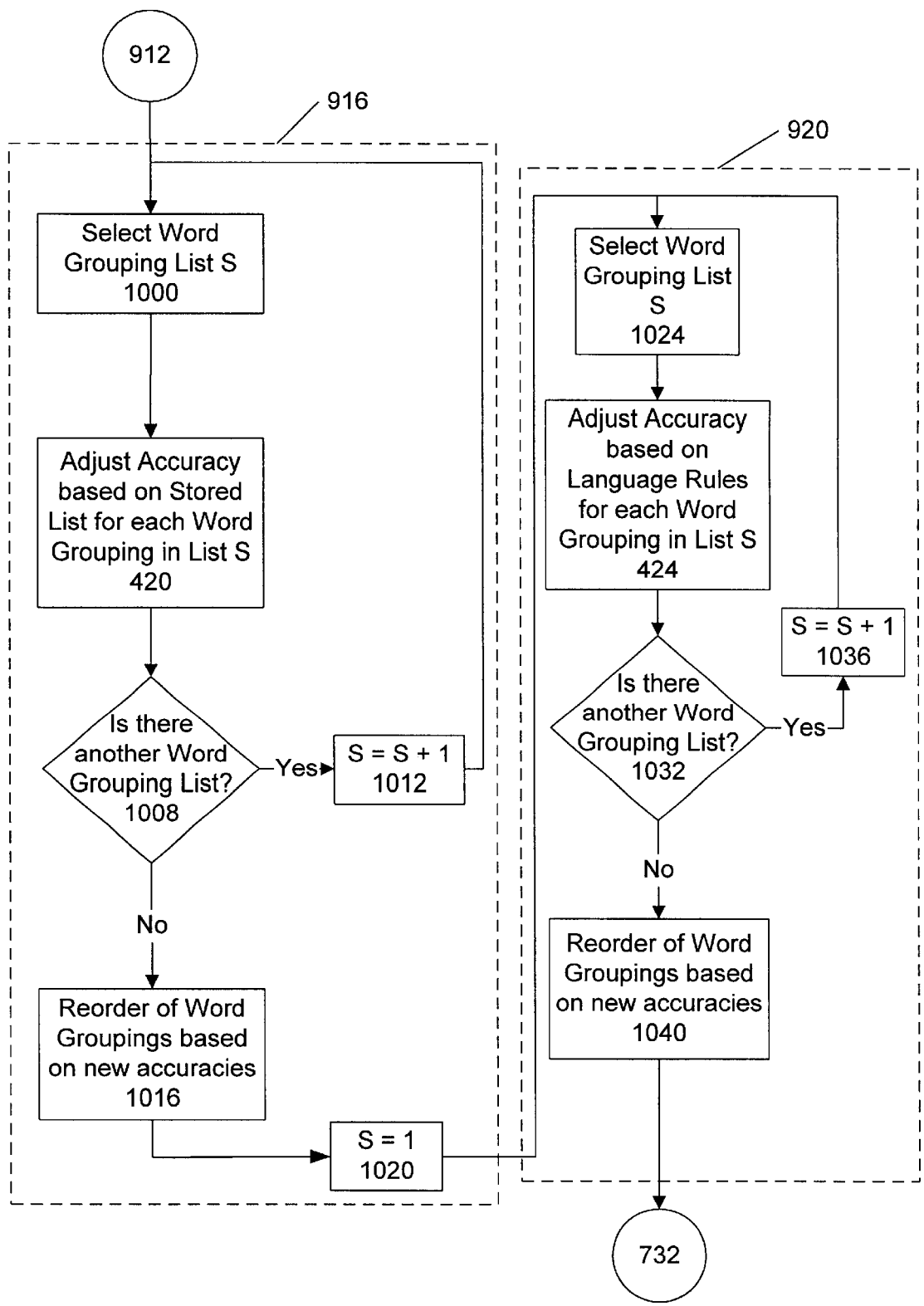
FIG. 10 is a more detailed flowchart of process step 736 of the present invention.

FIG. 10 illustrates the display word grouping aspect of the present invention, which may be used in the single or multiple OCR embodiments of the present invention.

However, it is described here with respect to the multiple OCR embodiment of the present invention. A first word grouping version table 850 is selected 1000. The version in the first position in the table 850 is retrieved 1004 as it is the most accurate version based upon the ordering performed earlier. In one embodiment, the composite version of the word grouping is compared 1004 to the retrieved version to determine which is the most accurate version. This embodiment may be made into an optional step dependent upon the accuracy of the most accurate version of the word grouping. If the most accurate version of the word grouping has an accuracy value 260 greater than a threshold, no composite word grouping is created. This saves on processing time, as composite word grouping creation may be a time-consuming process for low-speed processors. The threshold may be specified by the system, or is preferably a user-defined threshold level.

Figure 11:
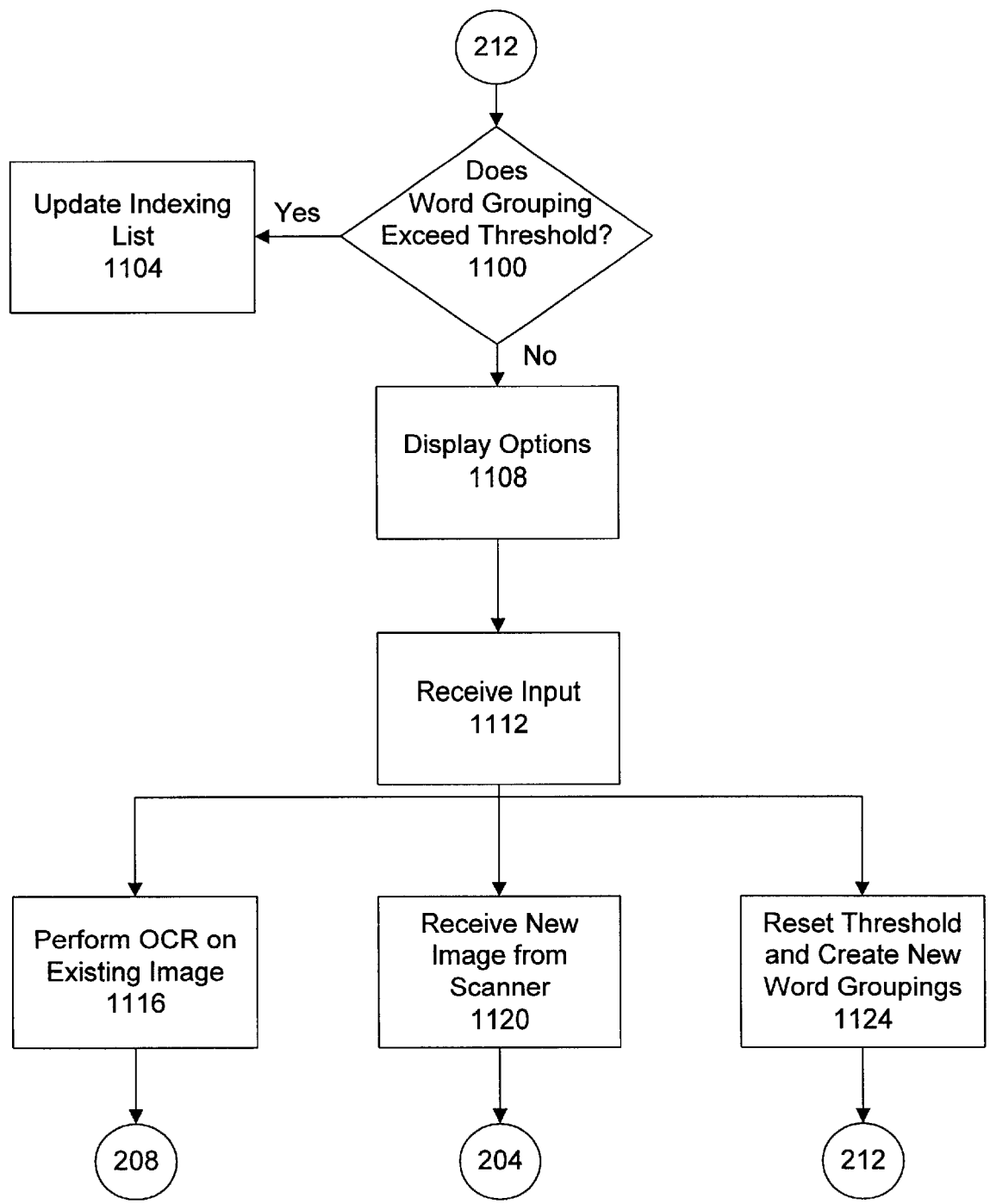
FIG. 11 is a flowchart illustrating an updating indexing list embodiment in accordance with the present invention.

Finally, the most accurate version of the word grouping is displayed 1008. Alternatively, the most accurate version is used to create a list used for indexing the document, as shown in FIG. 11. In this embodiment, if the system determines 1100 that a version of the word grouping has an accuracy value which exceeds a threshold, the version is used to update 1104 an indexing list. Again, the threshold is a level of accuracy the user 180 desires for the user's system. By keeping all of the versions which exceed the threshold, the user 180 can eliminate, to the greatest extent possible, OCR mistakes which are not caught by the above-described processes. For example, if the table 850 contains three versions of the word "ear" which exceed the threshold, and the most accurate version is "eat", and the other two are "ear", a system which keeps the version with the highest accuracy value will incorrectly keep "eat" as the version of the word. A system which keeps all three will also keep the versions which have the correct representation of the word "ear." Thus, in those systems, the document is able to be retrieved by using "ear" as a search term. However, by keeping multiple versions, more disk space is used in keeping the longer indexing lists.

If none of the word groupings exceed the threshold, in either the single or multiple OCR embodiments of the present invention, the user 180 is preferably displayed 1108 several options regarding how to proceed. After receiving 1112 an input, the system executes the option selected. A first option 1116 is to perform the OCR again, in an attempt to increase the character accuracy values. If multiple OCRs are present in the system the user 180 may select one of the other OCRs. A second option 1120 is to re-scan the document. This may provide a cleaner image for the OCR to recognize. A third option 1124 is to allow the user 180 to lower the threshold. If the word groupings consistently fail to meet the threshold, the user 180 may have set the threshold too high for the user's system.

The above description is included to illustrate the operation of the preferred embodiments and is not meant to limit the scope of the invention. The scope of the invention is to be limited only by the following claims. From the above discussion many variations will be apparent to one skilled in the art that would yet be encompassed by the spirit and scope of the present invention.

What is claimed is:

1. A computer-implemented method for generating word grouping accuracy values in a system wherein data are received, characters are recognized within the received data, character accuracy values are generated from the recognized characters, and word groupings are created from the recognized characters, comprising:

selecting one of the created word groupings; obtaining character accuracy values for the characters within the selected word grouping;

decreasing the obtained character accuracy values responsive to the recognized character being a character known to be less accurately recognized by the character recognition technique; increasing the obtained character accuracy values responsive to the recognized character being a character known to be more accurately recognized by the character recognition technique;

calculating a word grouping accuracy value based upon the obtained character accuracy values; and repeating the selecting, obtaining, decreasing, increasing and calculating steps for each created word grouping.

2. The method of claim 1 wherein the received data are digital representations of text or graphics symbols.

3. The method of claim 1 in a system where there is a predefined set of language rules that govern word groupings, said method further comprising the step of:

decreasing the calculated word grouping accuracy value responsive to the selected word grouping contradicting one of the language rules.

4. The method of claim 1 in a system having one or more stored lists of word groupings, said method further comprising the steps of:

increasing the calculated word grouping accuracy value responsive to the selected word grouping matching one of the word groupings in the stored lists; and decreasing the calculated word grouping accuracy value responsive to the selected word grouping not matching one of the word groupings in the stored lists.

5. The method of claim 4 wherein the stored lists of word groupings include lists of technical words, words found in a dictionary, foreign words, and trade words.

6. The method of claim 1 further comprising the step of:

displaying the selected word grouping and the calculated word grouping accuracy value; and the repeating step further comprises repeating the selecting, obtaining, calculating, and displaying steps for each created word grouping.

7. The method of claim 1 wherein the calculating a word grouping accuracy value step comprises the substeps of:

determining a minimum character accuracy value of the obtained character accuracy values; and setting the word grouping accuracy value equal to the determined minimum character accuracy value.

8. The method of claim 1 in a system which uses an indexing list composed of word groupings to search for and retrieve documents, said method further comprising the step of:

adding to the indexing list word groupings whose accuracy values exceed a threshold accuracy level.

9. The method of claim 8 further comprising the step of:

responsive to none of the word groupings having an accuracy value which exceeds the threshold accuracy level, displaying an option to set the threshold accuracy level to a different value.

10. The method of claim 1 wherein there are multiple threshold accuracy levels, and visual quality symbols associated with each level, said method further comprising the steps of:

comparing the obtained accuracy values of the recognized characters to the multiple threshold accuracy levels; and assigning a visual identifier associated with a threshold closest in value to the recognized character's accuracy level.

11. A computer-implemented method for generating word grouping accuracy values in a system wherein data are received, characters are recognized within the received data, character accuracy values are generated from the recognized characters, and word groupings are created from the recognized characters, said method comprising the steps of:

selecting one of the created word groupings;
   obtaining character accuracy values for the characters within the selected word grouping;
   calculating a word grouping accuracy value based upon the obtained character accuracy values comprising the substeps of:
      selecting a character within the selected word grouping,
      determining whether the character accuracy value of the selected character exceeds a threshold accuracy level,
      responsive to the character accuracy value exceeding the threshold accuracy level, assigning a "one" to the character,
      responsive to determining that the character accuracy value does not exceed a threshold accuracy level, assigning a "zero" to the character,
      repeating the selecting, determining, assigning a "one", and assigning a "zero" substeps for each character in the selected word grouping,
      determining a word grouping accuracy value by the logical combination of characters assigned a "one" and the total number of characters in the selected word grouping; and
   repeating the selecting, obtaining, and calculating steps for each created word grouping.

12. The method of claim 11 wherein the determining a word grouping accuracy value step comprises dividing the number of characters assigned a "one" by the total number of characters in the word grouping.

13. A computer-implemented method for generating word grouping accuracy values in a system wherein data are received, characters are recognized within the received data, character accuracy values are generated from the recognized characters, and word groupings are created from the recognized characters, said method comprising the steps of:

selecting one of the created word groupings;
   obtaining character accuracy values for the characters within the selected word grouping;
   calculating a word grouping accuracy value based upon the obtained character accuracy values by the substeps of:
      responsive to determining that all of the character accuracy values are at least equal to a threshold accuracy value, calculating the word grouping accuracy value of the selected word grouping by calculating an average of the character accuracy values,
      responsive to determining that at least one of the character accuracy values is less than the threshold accuracy value, calculating the word grouping accuracy value by:
         dividing the number of characters that do not have an accuracy value that exceeds the threshold by one hundred, and
         subtracting the result from the threshold accuracy value; and
      repeating the selecting, obtaining, and calculating steps for each created word grouping.

14. A computer-implemented method for generating word grouping accuracy values in a system with multiple character recognition techniques, wherein data are received, characters are recognized within the received data, character accuracy values are generated from the recognized characters, word groupings are created from the recognized characters, and multiple versions of word groupings are created, each version being a version created from characters recognized by one of the character recognition techniques, said method comprising the steps of:

selecting one of the created word groupings;
   selecting one of the versions of the selected word grouping;
   obtaining character accuracy values for the selected version of the word grouping;
   calculating a word grouping accuracy value for the selected version of the word grouping based upon the obtained character accuracy values; and
   repeating the selecting one of the versions, obtaining character accuracy value, and calculating a word grouping accuracy value steps until all of the versions of the selected word grouping have been selected;
   determining a most accurate version of the selected word grouping; and
   repeating the selecting one of the created word groupings, selecting one of the versions of the selected word groupings, obtaining character accuracy value, calculating a word grouping accuracy value, and determining the most accurate version steps until all of the word groupings have been selected.

15. The method of claim 14 further comprising the step of: creating a composite word grouping, wherein a version of a word grouping is created from the most accurate versions of the characters that constitute the word grouping.

16. The method of claim 14, wherein the calculating a word grouping accuracy value step comprises the substeps of:

determining whether the character accuracy value exceeds a threshold accuracy value;
   responsive to determining the character accuracy value exceeds a threshold accuracy value, assigning a "one" to the character;
   responsive to determining the character accuracy value does not exceed a threshold accuracy value, assigning a "zero" to the character;
   repeating the obtaining, determining and assigning steps for each character in the selected word grouping; and
   determining a word grouping accuracy value by a logical combination of characters assigned a "one" and the total number of characters in the selected word grouping.

17. The method of claim 14 in a system where there is a predefined set of language rules that govern word groupings, said method further comprising the step of:

decreasing the calculated word grouping accuracy value responsive to the selected word grouping contradicting one of the language rules.

18. The method of claim 14 in a system where there is at least one stored list of word groupings, said method further comprising the steps of:

increasing the calculated word grouping accuracy value responsive to the selected word grouping matching one of the word groupings in the at least one stored list; and
   decreasing the calculated word grouping accuracy value responsive to the selected word grouping not matching one of the word groupings in the at least one stored list.

19. A computer-readable medium containing a computer program that calculates word grouping accuracy values from data received in a document imaging system, wherein data are received, characters are recognized within the received data, "by performing a character recognition technique" character accuracy values are generated from the recognized characters, and word groupings are created from the recognized characters, and the program causes the processor to select one of the created word groupings, obtain character accuracy values for the characters within the selected word grouping, decrease the obtained character accuracy values responsive to the recognized character being a character known to be less accurately recognized by the character recognition technique, increase the obtained character accuracy values responsive to the recognized character being a character known to be more accurately recognized by the character recognition technique, calculate a word grouping accuracy value based upon the obtained character accuracy values, and repeat selecting, obtaining, and calculating for each created word grouping.

20. In a system for generating word grouping accuracy values wherein data are received, characters are recognized within the received data, character accuracy values are generated from the recognized characters, and word groupings are created from the recognized characters, a computer apparatus comprising:

a data receiver, for receiving data;

coupled to the data receiver, a first memory, for storing the received data;

coupled to the first memory, a central processing unit, for performing:
  selecting one of the created word groupings,
  obtaining character accuracy values for the characters within the selected word grouping,
  decreasing the obtained character accuracy values responsive to the recognized character being a character known to be less accurately recognized by the character recognition technique, increasing the obtained character accuracy values responsive to the recognized character being a character known to be more accurately recognized by the character recognition technique, calculating a word grouping accuracy value based upon the obtained character accuracy values, and
  repeating the selecting, obtainingm, decreasing, increasing, and calculating steps for each created word grouping; and coupled to the central processing unit, RAM, for temporarily storing the created word groupings.

* * * * *